United States Patent
George

(10) Patent No.: US 10,267,420 B2
(45) Date of Patent: Apr. 23, 2019

(54) HIGH TEMPERATURE TEXTILE-CARTRIDGE SEAL SYSTEMS AND METHODS

(71) Applicant: The Boeing Company, Chicago, IL (US)

(72) Inventor: Nevin Michael George, Lake Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/600,634

(22) Filed: May 19, 2017

(65) Prior Publication Data

US 2018/0335143 A1  Nov. 22, 2018

(51) Int. Cl.
| | |
|---|---|
| *F16J 15/46* | (2006.01) |
| *F16J 15/10* | (2006.01) |
| *F16J 15/12* | (2006.01) |
| *F02C 7/28* | (2006.01) |

(52) U.S. Cl.
CPC .......... *F16J 15/102* (2013.01); *F16J 15/126* (2013.01); *F02C 7/28* (2013.01); *F05D 2220/323* (2013.01); *F05D 2220/80* (2013.01)

(58) Field of Classification Search
CPC .......... F16J 15/102; F16J 15/126; F02C 7/28; F05D 2220/323; F05D 2220/80; F02K 1/805
See application file for complete search history.

(56) References Cited

U.S. PATENT DOCUMENTS

| | | | | |
|---|---|---|---|---|
| 3,121,995 | A | * | 2/1964 | Albani ................. F02K 1/1261 60/761 |
| 4,453,723 | A | * | 6/1984 | Greenwald ........... B29C 43/027 277/618 |
| 4,917,302 | A | | 4/1990 | Steinetz et al. |
| 5,014,917 | A | | 5/1991 | Sirocky et al. |
| 5,975,532 | A | * | 11/1999 | Karttunen ................. D21F 3/10 162/371 |
| 6,039,325 | A | | 3/2000 | Steinetz et al. |

* cited by examiner

*Primary Examiner* — Gilbert Y Lee
(74) *Attorney, Agent, or Firm* — Haynes and Boone, LLP

(57) ABSTRACT

A sealing device is coupled to a first structure and is configured to seal a gap between the first structure and a second structure. The sealing device includes a translatable cartridge including a first wall and a second wall parallel to each other and a third wall perpendicular to and coupled to the first and second walls. A force applying device is configured to apply force on the cartridge in a direction toward the second structure such that the cartridge is exerted against the second structure. A ceramic insulation layer disposed at the third wall such that the ceramic insulation layer is between the third wall and the second structure, and an abrasion layer disposed on the ceramic insulation layer.

18 Claims, 6 Drawing Sheets

HIGH TEMPERATURE TEXTILE-CARTRIDGE SEAL SYSTEMS AND METHODS

BACKGROUND

Technical Field

The present application generally relates to sealing gaps formed between two structures. More particularly, it relates to sealing gaps having a varying geometry in high temperature environments.

Related Art

In many high temperature applications, such as aircraft combustion and exhaust systems, sealing members are used to seal gaps between two structures. Often, the size or geometry of these gaps vary as the structures are moved or as a consequence of changes in temperature and/or pressure. Thus, the sealing members must typically be able to withstand high temperatures, high pressures, and be able to adjust to varying geometries of the gap in real-time to maintain the seal and minimize leakage (e.g., of gasses such as exhaust, air, or combustion) through the gap.

One conventional method for sealing variable gaps in high temperature environments include, for example, using curved metal sheets to seal the gap. However, such conventional curved metal sheet seals are disadvantageous because they are prone to fatigue failure and cracking, and are poorly suited for complex shapes and dynamics. Other conventional methods include rope seals and/or wafer-style plunger seals. However, rope seals tend to have poor wear resistance, while wafer-style plungers themselves may have good wear resistance, they tend to wear out the opposing sealing surfaces, especially for complex shapes and/or motion. As such, existing conventional methods are disadvantageous and an improved sealing method and device are desirable.

SUMMARY

According to an aspect of an embodiment of the present disclosure, a sealing device and techniques for sealing a gap (e.g., having a variable geometry) between two structures that are static or have relative motion there between is provided. Moreover, the described techniques are suitable for use in applications that operate in harsh environments at high pressures and high temperatures such as in military or commercial aircraft combustion environments, such as in engines and exhaust systems.

According to an aspect of an embodiment of the present disclosure, an apparatus includes a sealing device coupled to a first structure and configured to seal a gap between the first structure and a second structure. The sealing device includes a translatable cartridge including a first wall and a second wall parallel to each other and a third wall perpendicular to and coupled to the first and second walls, a force applying device configured to apply force on the cartridge in a direction toward the second structure such that the cartridge is exerted against the second structure, a ceramic insulation layer disposed at the third wall such that the ceramic insulation layer is between the third wall and the second structure, and an abrasion layer disposed on the ceramic insulation layer.

The first wall, the second wall, and the third wall each include an inner surface and an outer surface, and wherein the outer surface of the first wall and the second wall slidably abuts sidewalls of an opening formed at the first structure such that the cartridge translates in a direction toward and away from the second structure based on force applied by the force applying device and/or movement of the first or second structures.

According to another aspect of an embodiment of the present disclosure, a method for sealing a gap between a first structure and a second structure is described. The method includes disposing a translatable cartridge having a ceramic insulation layer and an abrasion layer between the first structure and the second structure, applying force to the translatable cartridge in a direction toward the second structure, and slidably translating the translatable cartridge in response to the applied force, such that the ceramic insulation layer and the abrasion layer are exerted against the second structure to seal the gap.

The translatable cartridge may include a first wall and a second wall parallel to each other, and a third wall perpendicular to and coupled to the first and second walls, each of the first second, and third walls comprising an inner surface and an outer surface, and wherein the outer surface of the first wall and the second wall slidably abuts sidewalls of an opening formed at the first structure.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
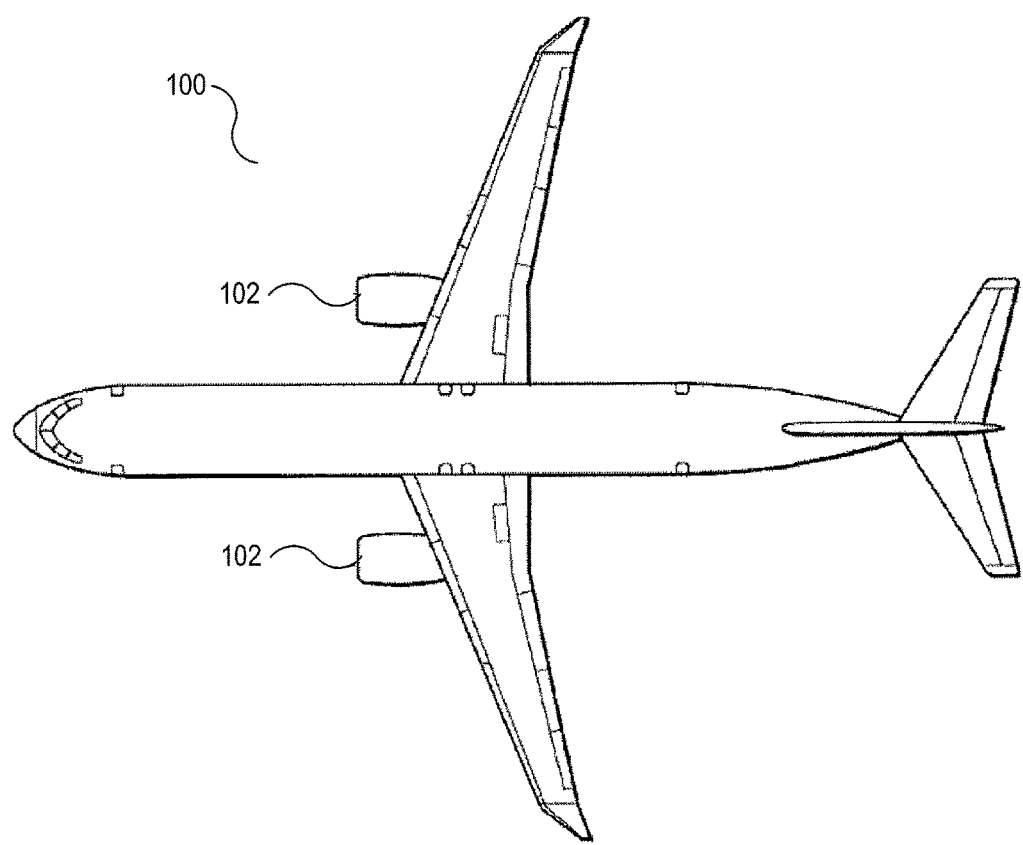
FIG. 1 is a diagram of an aircraft as an example for implementing one or more of the embodiments described throughout the present application.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

In applications that do not involve extremely high temperatures, when it is desired to seal a space or a gap between two structures, for example, to prevent gas leakage from one side to the other side, various sealing techniques are available. For example, a rubber or silicone gasket can be used to seal a gap between the two structures. If the two structures are configured to have relative motion with respect to one another, a lubricant can be applied to the opposing surfaces or the gasket to facilitate smooth movement between the two structures while maintaining the seal. However, in extremely high temperature applications (e.g., ~1000° F.), different sealing techniques are considered in order to withstand such extreme temperatures because rubber or silicone can melt in these high temperatures.

One example of a high temperature application where a seal is needed between two structures is in engines of aircrafts (e.g., an aircraft is illustrated generally in FIG. 1 labeled 100 and engines 102). For example, in gas turbine afterburning engines on supersonic or hypersonic, commercial or military aircrafts, the cross-sectional area of the exhaust is typically varied depending on whether the engine is operating in dry mode (i.e., without afterburner) or wet mode (i.e., with afterburner). When the engine is operating in dry mode, the cross-sectional area of the exhaust is relatively smaller (compared to wet mode) and when the engine is operating in wet mode, the cross-sectional area of the exhaust is relatively larger (compared to dry mode). Such variances in the cross-sectional area of the exhaust can be accomplished by moving one or more sidewalls within the exhaust to change the height or width of the exhaust channel to obstruct or clear at least a portion of exhaust channel to effectively reduce or increase the cross-sectional area of the exhaust channel.

Afterburning gas turbine engines typically operate at high surface temperatures of around 1000° F. to 1800° F. and are therefore made of a suitable metallic material such as tungsten based alloys, nickel based alloys, or other superalloys, which are designed to withstand such harsh temperatures. As the metallic sidewall of the exhaust is moved, for example, in an inward direction to reduce the cross-sectional area of the exhaust channel, the movable sidewall must maintain a seal with the fixed sidewall while at the same time being able to slide along each other. However, it is often difficult to achieve a good seal between two substantially hard surfaces (e.g., metal-to-metal surfaces), particularly while allowing for relative motion between them. Even if a seal is achieved between the metal-to-metal surfaces, the surfaces typically exhibit poor wear resistance and therefore may require more frequent maintenance or replacement.

Figure 2:
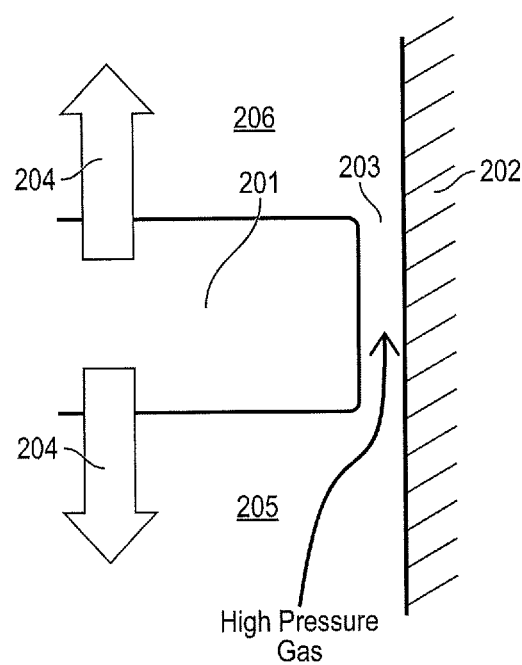
FIG. 2 is a block diagram of a variable geometry gap between a first structure and a second structure according to various embodiments of the present disclosure.

FIG. 2 is an example illustration of a movable structure 201 and a fixed structure 202, with a gap 203 formed between the surfaces of the two structures. When there is a pressure differential between a first side 205 of the movable structure 201 and a second side 206 of the movable structure 201, a higher pressure gas from one side (e.g., the first side 205 of the movable structure 201) may pass through the gap 203 to the lower pressure side (e.g., the second side 206). In order to minimize this leakage, the size of the gap 203 can be reduced by positioning the movable structure 201 and the fixed structure 202 closer together. However, as illustrated, the movable structure 201 is configured to move in directions shown by arrows 204 (e.g., a direction parallel to the plane of the fixed structure). Thus, if the movable structure 201 and the fixed structure 202 are positioned too close together (e.g., close enough such that they contact each other), then the surfaces may rub or grind again each other and quickly wear out or bind.

The embodiments of the present disclosure will describe methods and devices for sealing gaps (e.g., variable gaps) between two structures in a high temperature environment. A high temperature sealing device may be disposed in the gap or the variable gap between the two structures such that the gap between the movable structure 201 and the fixed structure 202 is sealed while still allowing movement between the movable structure 201 and the fixed structure 202 without exhibiting poor wear resistance. Furthermore, the sealing device is able to withstand high temperatures in the range about 1000° F. to 1800° F.

The embodiments of the present disclosure will be described with reference to an aircraft exhaust system as provided above. However, the explanation with reference to an aircraft exhaust system is provided merely for the purpose of explaining the various embodiments in the context to help the reader understand an example implementation of the invention. The embodiments of the present disclosure are not limited to its applicability in just an aircraft exhaust. Instead, it may be applicable in other systems that exhibit similar problems of sealing a gap between two structures. Furthermore, the two structures may be either both movable structures, both fixed structures, or one fixed structure and one movable structure.

Figure 3:
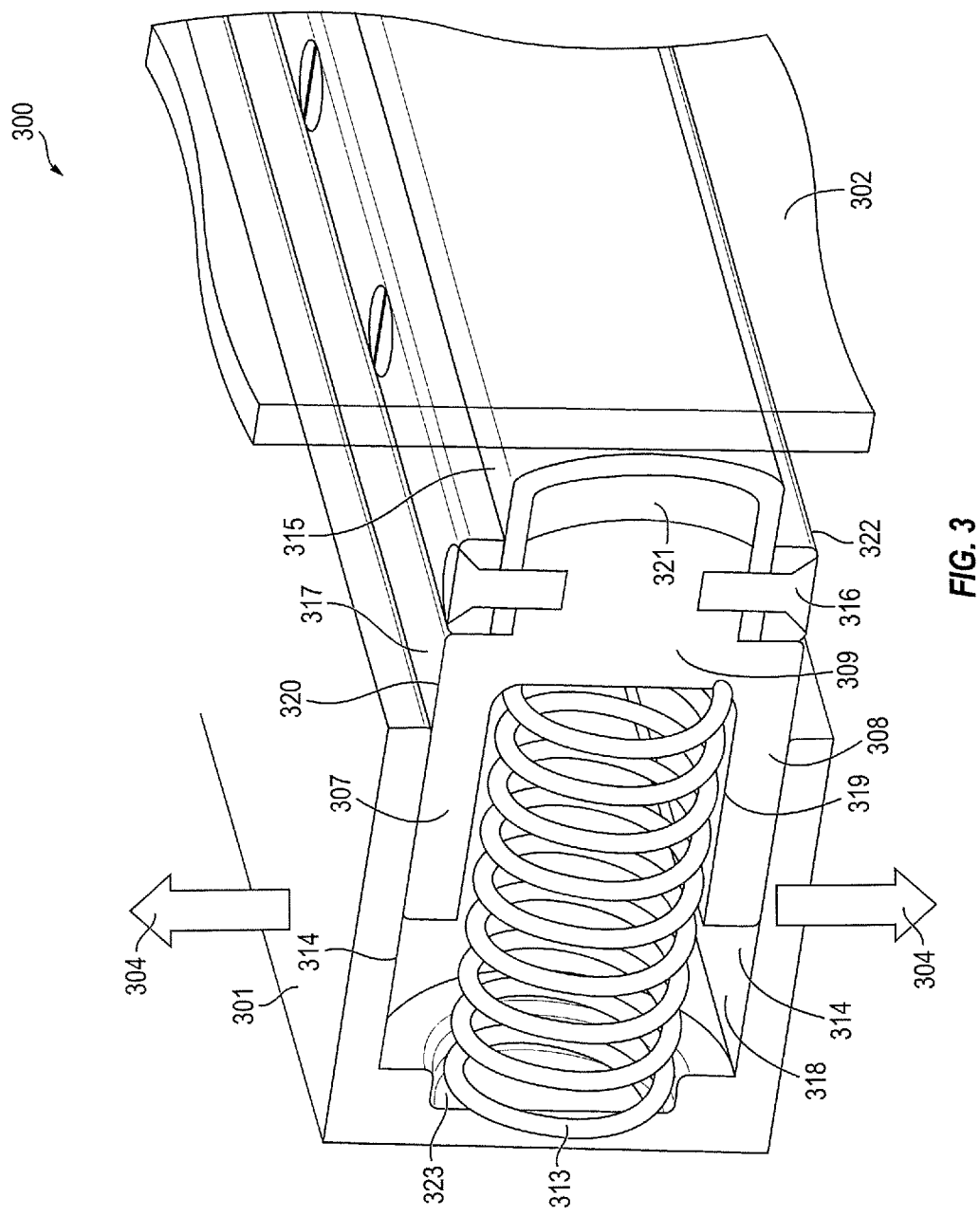
FIG. 3 is a cross-sectional isometric view of a gap seal according to various embodiments of the present disclosure.
Figure 4:
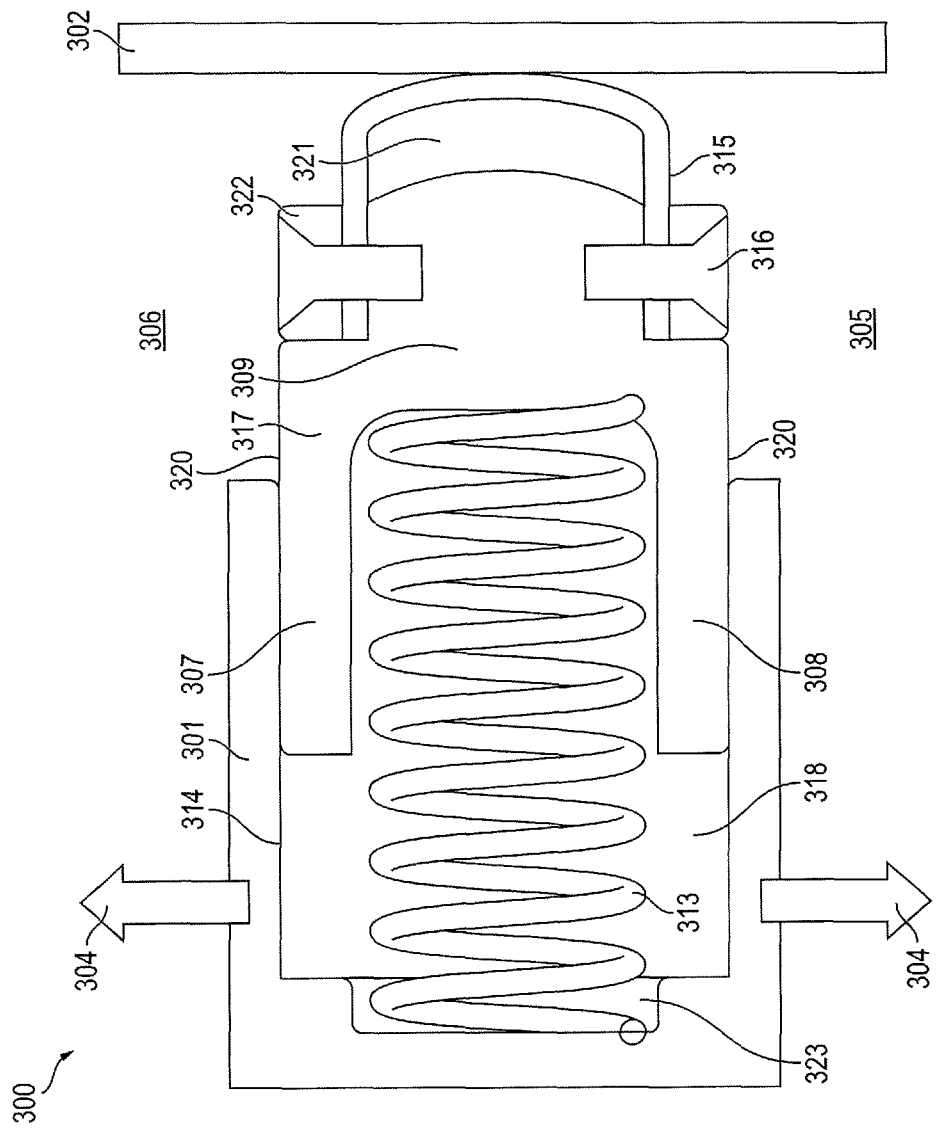
FIG. 4 is a cross-sectional side view of the gap seal according to various embodiments of the present disclosure.

FIGS. 3 and 4, respectively illustrate a three dimensional view and a two dimensional view of a sealing device 300 disposed between a first structure 301 and a second structure 302, according to an embodiment of the present disclosure. In this example embodiment, the first structure 301 is movable in the direction indicated by arrows 304, and the second structure 302 is a fixed structure for the purpose of describing this particular embodiment, but it is not limited to such configuration. In some embodiments, the first structure 301 may be a fixed structure and the second structure 302 may be a movable structure. Yet in other embodiments, both the first structure 301 and the second structure 302 may be movable structures or fixed structures.

The sealing device 300 includes a translatable cartridge 317 that fits in an opening 318 formed along an edge of the first structure 301. The opening is a substantially rectangular groove or a channel that is formed in the first structure 301 and has substantially flat sidewalls 314 to allow the translatable cartridge 317 to slide in and out of the opening 318. The translatable cartridge 317 includes a first wall 307 and a second wall 308 that are substantially parallel to each other, and a third wall 309 that is substantially perpendicular to and coupled to the first wall 307 and the second wall 308. In some embodiments, the first wall 307, the second wall 308 and the third wall 309 form a generally U-shape. However, the walls of the translatable cartridge 317 according to various embodiments of the present disclosure are not limited to just the U-shape, and may instead form other shapes and/or configurations. In some embodiments, the walls of the translatable cartridge 317 are made of nickel alloy such as, for example, Inconel 625 or Inconel 718. In some embodiments, the walls of the translatable cartridge 317 may be made of other metal alloys or other suitable material.

The first wall 307, and second wall 308, and the third wall 309 have an inner surface 319 and an outer surface 320. The outer surface 320 of the first wall 307 and the outer surface 320 of the second wall 308 slidably abuts the sidewalls 314 of the opening 318 such that the translatable cartridge 317 is able to slide in and out of the opening 318.

In some embodiments, a ceramic insulation layer 321 is disposed on the outer surface 320 of the third wall 309, and an abrasion layer 315 may be disposed on the ceramic insulation layer 321 such that the ceramic insulation layer 321 and the abrasion layer 315 are both between the outer surface 320 of the third wall 309 and the second structure 302. The ceramic insulation layer 321 may be attached to the first wall 307 using for example, heat resistive adhesive, fasteners, clips, and/or other methods typically used to attach similar ceramic insulation material. In some embodiments, the ceramic insulation layer 321 is a high temperature resistance ceramic material such as, for example, woven ceramic fiber, ceramic fiber batting, and/or ceramic fiber mat such as SAFFIL®.

Figure 5:
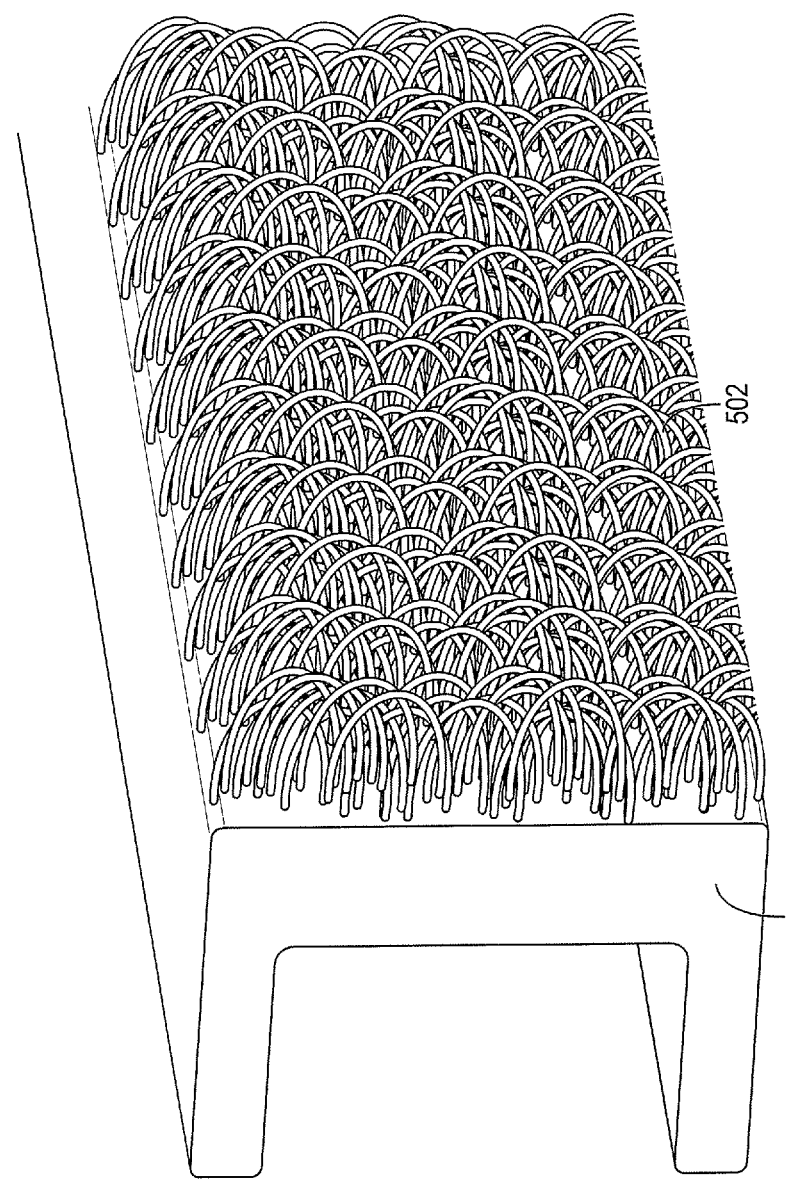
FIG. 5 is a cross-sectional isometric view of the gap sealing apparatus according to another embodiment of the present disclosure.

In some embodiments, the abrasion layer 315 is made of connected loops of fiber. The fiber may include metal alloy wires knitted together with ceramic wires as described in co-pending U.S. patent application Ser. No. 15/012,509 filed Feb. 1, 2016, which is incorporated herein by reference in its entirety. FIG. 5 illustrates one example embodiment of the connected loops 502 of the abrasion layer. In some embodiments, the connected loops 502 may be mounted in a base layer 501, and the base layer 501 together with the connected loops 502 form the abrasion layer 315.

In some embodiments, the abrasion layer 315 may be attached to the third wall 309 and the ceramic insulation layer 321 such that the abrasion layer 315 wraps around and covers the ceramic insulation layer 321 using clamps 322 and fasteners 316. In this way, the abrasion layer 315 may serve to protect the ceramic insulation layer 321 from wear, thus improving durability and lowering the friction between the sealing device 300 and the surface of the second structure 302. In some embodiments, the abrasion layer 315 may be attached to the third wall 309 and the ceramic insulation layer 321 according to other methods such as using heat resistance adhesives.

In some embodiments, a force applying device 313 is provided in the opening 318 of the first structure 301 and is configured to apply a force on the translatable cartridge 317 in a direction toward the second structure 302 such that the translatable cartridge 317 is exerted against the second structure 302. In some embodiments, the force applying device 312 is a spring coil disposed in the opening 318 of the first structure 301 and between the opening 318 of the first structure 301 and the translatable cartridge 317. A slot 323 may be provided at one end of the opening 318, and the spring coil may be disposed in the slot 323 so as to maintain the spring coil in place.

The spring coil may be configured to expand outwardly to force the translatable cartridge 317 in the direction of the second structure 302. In some embodiments, the spring coil may be selected such that a force of about 10 to about 30 pounds per square inch is applied to the translatable cartridge 317, which in turn, exerts a force of about 10 to about 30 pounds per square inch to the second structure 302. In doing so, the ceramic insulation layer 321 and the abrasion layer 315 are compressed against the second structure 302 to effectively create a seal between the first structure 301 and the second structure 302 to avoid or present leakage from a first side 305 to a second side 306, or vice versa.

In some embodiments, the first structure 301 may comprise a plurality of the spring coils distributed in the opening 318 along an entire length of the edge of the first structure 301 comprising the translatable cartridge 317 so as to evenly distribute the force from the spring coils across the translatable cartridge 317. In some embodiments, the force applying device 313 may include other force applying device or methods, such as, for example, compressed gas and/or hydraulics configured to apply a pressure of about 10 to about 30 pounds per square inch. For example, the opening 318 may be filled with compressed gas such that when the first structure 301 along with the translatable cartridge 317 is applied against the surface of the second structure 302, a force of about 10 to about 30 pounds per square inch is applied toward the second structure 302 to maintain a seal. While the described embodiments use a force of about 10 to 30 pounds per square inch by way of example only and are not intended to be limiting. Different applications may utilize different amounts of force.

In some embodiments, the outer surface 320 of the third wall 309 is curved to form a curved surface by the ceramic insulation layer 321 and the abrasion layer 315. The curved surface of the sealing surface accommodates the movement of the first structure 301 so that the edges of the abrasion layer 315 and the ceramic insulation layer 321 are not caught on the surface of the second structure 302 (e.g., uneven deflections) as the first structure 301 is moved.

Figure 6:
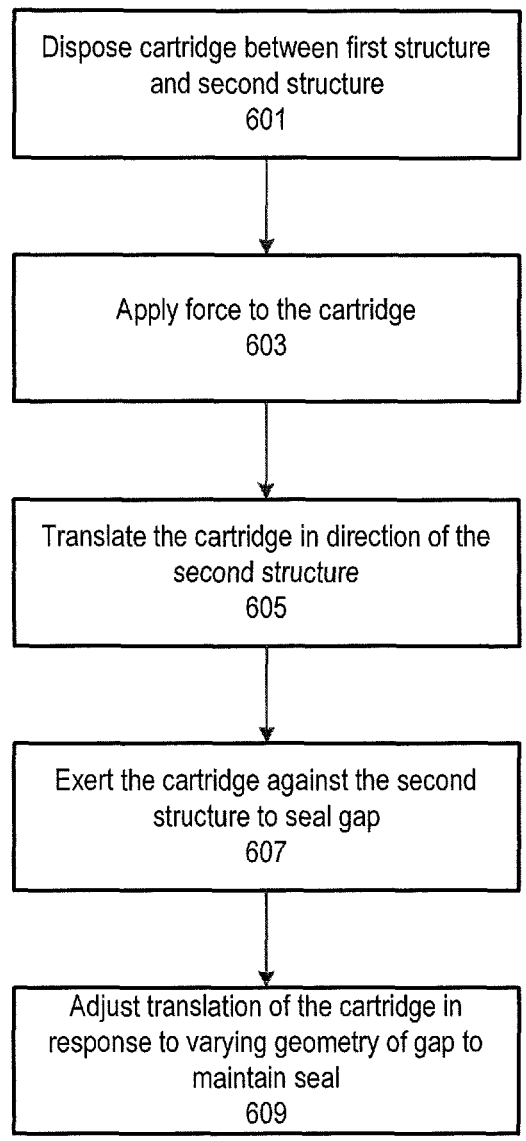
FIG. 6 is a flow chart describing a sealing method according to various embodiments of the present disclosure.

FIG. 6 is a flow chart that describes the sealing method provided above where the translatable cartridge 317 compresses the ceramic insulation layer 321 and the abrasion layer 315 toward the second structure 302 to provide a seal between the first structure 301 and the second structure 302.

According to an embodiment, the sealing device 300 is disposed between the first structure 301 and the second structure 302. In more detail, the translatable cartridge 317 is disposed in the opening 318 of the first structure 301 (601). A force is applied to the translatable cartridge 317 by the force applying device 313 toward the second structure 302 (603), which in turn causes the translatable cartridge 317 to move in the direction of the second structure (605). Ceramic insulation layer 321 such as SAFFIL® are compressible such that when force is applied by the force applying device 313, the translatable cartridge 317 compresses the ceramic insulation layer 321 against the second structure 302 to seal the gap (607). The compressibility of the ceramic insulation layer 321 compensates for any uneven deflections on the surface of the second structure 302. In some embodiments, the force applying device 313 allows the sealing device 300 to seal gaps between the structures even if the geometry of the gap is variable. Thus, if the size of the gap increases or decreases, the force applying device 313 is able to compensate for the changes in the gap size by adjusting the translatable cartridge inward or outward from the opening 318 to maintain the seal (609). In some embodiments, the abrasion layer 315 provided over the ceramic insulation layer 321 provides durability to the sealing surface to increase the wear resistance of the sealing device 300.

Throughout the present disclosure, it should be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are exemplary only. One skilled in the art may recognize various alternative embodiments from those specifically disclosed. Those alternative embodiments are also intended to be within the scope of this disclosure. As such, the embodiments are limited only by the following claims and their equivalents.

The invention claimed is:

1. An apparatus comprising:
a sealing device coupled to a first structure and configured to seal a gap between the first structure and a second structure, the sealing device comprising:
a rigid translatable cartridge comprising a first wall and a second wall parallel to each other and a third wall perpendicular to and coupled to the first and second walls;
a force applying device configured to apply force on the rigid translatable cartridge in a direction toward the second structure such that the rigid translatable cartridge is exerted against the second structure;
a ceramic insulation layer disposed at the third wall such that the ceramic insulation layer is between the third wall and the second structure; and
an abrasion layer disposed on the ceramic insulation layer, wherein the first wall, the second wall, and the third wall each comprise an inner surface and an outer surface, wherein the outer surface of the first wall and the second wall slidably abuts sidewalls of an opening formed as a channel at the first structure such that the rigid translatable cartridge translates in a direction toward and away from the second structure based on force applied by the force applying device and/or movement of the first or second structures, wherein the first structure and the second structure comprise metallic surfaces, and wherein the first structure, the second structure, and the sealing device form a part of an exhaust channel of an aircraft engine.

2. The apparatus of claim, 1 wherein the force applying device is further configured to apply force on the inner surface of the third wall such that the outer surface of the third wall is exerted toward the second structure.

3. The apparatus of claim 2, wherein the ceramic insulation layer is disposed on the outer surface of the third wall, and comprises one or more selected from the group consisting of: woven ceramic fiber, ceramic fiber batting, and ceramic fiber mat, and wherein the abrasion layer is removably secured to the third wall.

4. The apparatus of claim 3, wherein the abrasion layer comprises connected loops of metal alloy and/or ceramic fibers such that the force applied by the force applying device compresses the ceramic insulation layer and the abrasion layer to seal the gap, and wherein the abrasion layer increases a wear resistance of the sealing device as the rigid translatable cartridge is exerted against the second structure and/or responds to movement of the first or second structures.

5. The apparatus of claim 4, wherein the metal alloy and/or ceramic fibers of the connected loops are configured to reduce friction on the second structure from movement by the first structure.

6. The apparatus of claim 1, wherein the gap comprises a varying geometry, and wherein:
the first structure is a movable structure and the second structured is a fixed structure, or
the first structure is a fixed structure and the second structure is a movable structure, or
the first structure and the second structure are both movable structures.

7. The apparatus of claim 6, wherein the outer surface of the third wall is curved to accommodate movement by the first structure and/or the second structure.

8. The apparatus of claim 1, wherein the force applying device comprises a spring coil or compressed gas.

9. The apparatus of claim 8, wherein the spring is disposed between the inner surface of the third wall and the opening formed at the first structure.

10. The apparatus of claim 1, wherein the first wall, the second wall, and the third wall form a generally U-shape.

11. The apparatus of claim 1, wherein the force applying device applies a force of about 10 to about 30 pounds per square inch.

12. A method for sealing a gap between a first structure and a second structure by a sealing device, the method comprising:
   disposing the sealing device comprising a rigid translatable cartridge having a ceramic insulation layer and an abrasion layer between the first structure and the second structure;
   applying force to the rigid translatable cartridge in a direction toward the second structure; and
   slidably translating the rigid translatable cartridge in response to the applied force such that the ceramic insulation layer and the abrasion layer are exerted against the second structure to seal the gap, wherein the rigid translatable cartridge comprises a first wall and a second wall parallel to each other, and a third wall perpendicular to and coupled to the first and second walls, each of the first, second, and third walls comprising an inner surface and an outer surface, and wherein the outer surface of the first wall and the second wall slidably abuts sidewalls of an opening formed as a channel at the first structure, wherein the first structure and the second structure comprise metallic surfaces, and wherein the first structure, the second structure, and the sealing device form a part of an exhaust channel of an aircraft engine.

13. The method of claim 12, wherein the ceramic insulation layer is disposed on the outer surface of the third wall and between the third wall and the abrasion layer, and the abrasion layer is disposed between the ceramic insulation layer and the second structure, wherein the abrasion layer is removably secured to the third wall.

14. The method of claim 12, wherein the ceramic insulation layer comprises one or more selected from the group consisting of: woven ceramic fiber, ceramic fiber batting, and ceramic fiber mat.

15. The method of claim 14, wherein the abrasion layer comprises connected loops of metal alloy and/or ceramic fibers such that the applied force compresses the ceramic insulation layer and/or the abrasion layer to seal the gap, and wherein the abrasion layer increases a wear resistance of the sealing device as the ceramic insulation layer and the abrasion layer are exerted against the second structure.

16. The method of claim 12,
   wherein:
      the first structure is a movable structure and the second structure is a fixed structure, or
      the first structure is a fixed structure and the second structure is a movable structure, or
      the first structure and the second structure are both movable structure,
   wherein a geometry of the gap varies in response to moving the movable structure, and
   wherein the method further comprises translating the rigid translatable cartridge in the direction toward the fixed structure in response to an increasing geometry of the gap and translating the rigid translatable cartridge in the direction away from the fixed structure in response to a decreasing geometry of the gap.

17. The method of claim 12, wherein the force is applied with a spring coil or compressed gas.

18. The method of claim 12, wherein the applying the force comprises applying a force of about 10 to about 30 pounds per square inch.

* * * * *